Patented Nov. 13, 1923.

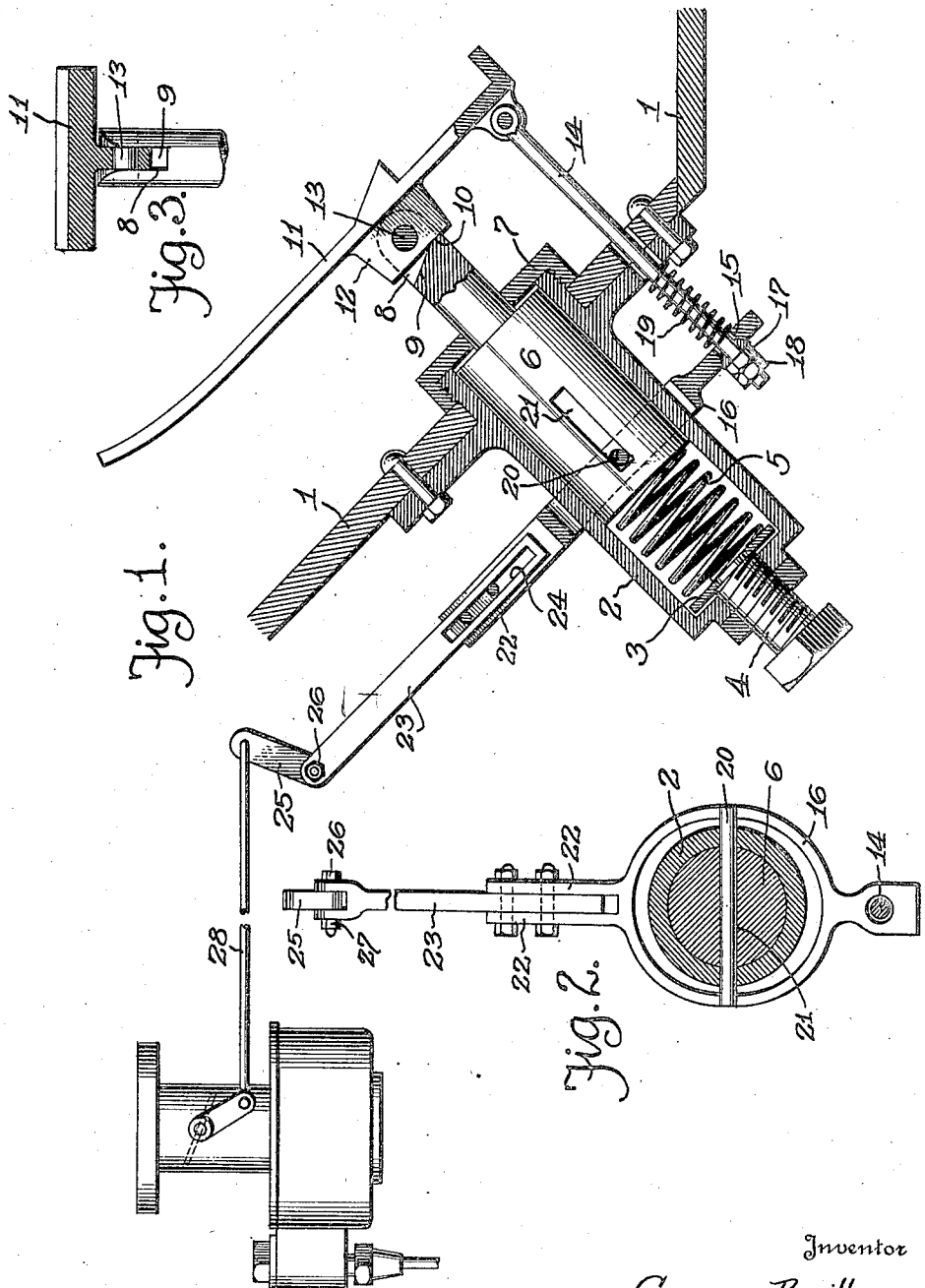

1,473,754

UNITED STATES PATENT OFFICE.

GEORGE BAILHE, OF FORT WAYNE, INDIANA.

THROTTLE-CONTROL APPARATUS FOR MOTOR VEHICLES.

Application filed March 19, 1921. Serial No. 453,797.

*To all whom it may concern:*

Be it known that I, GEORGE BAILHE, a citizen of the United States of America, residing at the city of Fort Wayne, county of Allen, State of Indiana, have invented certain new and useful Improvements in Throttle-Control Apparatus for Motor Vehicles, of which the following is a specification.

This invention relates to throttle-control apparatus for motor vehicles, and has for its objects, among others, to provide a mechanism whose use and operation provides a great measure of safety to the driver and the public in the operation of motor vehicles. In the modern development of such vehicles it is common to use what is termed an accelerator, usually operated by the foot to increase the speed of the car by increasing the fuel supply to the carburetor. Experience has shown that the drivers of motor cars not infrequently, in situations requiring a quick application of the brakes, apply the foot to the accelerator instead of the brake, resulting in speeding up the car instead of stopping it. From such mistakes serious accidents frequently occur. One of the objects of my invention is to provide a throttle control which will open the throttle and increase the fuel supply as desired but which will permit the throttle to close by automatic action in the event of the mistake of the driver in violently pressing the throttle-control mechanism in the belief that he is applying the brakes. Another object of my invention is to provide a cushioned foot-rest which will greatly add to the comfort of the driver by absorbing the vibrations of the car in driving over rough and uneven roads, and also to provide a resilient member against which the throttle control member operates, thus affording means for preventing violent and unintentional changes in the fuel supply.

With these and other objects in view I have devised the throttle-control mechanism which I will now describe, referring to the drawings forming a part of my specification and using reference numerals to indicate the several parts.

Fig. 1, is a vertical longitudinal section showing my throttle-control secured to the floor-board of a motor vehicle.

Fig. 2, is a plan section of a part of my oscillating lever.

Fig. 3, is a cross-section through the pivot of the pedal.

In the accompanying drawings the numeral 1 indicates the floor-board of the vehicle to which is secured a cylinder or casing 2, by any suitable means. At the bottom of the casing is a plate 3 which rests upon or may be secured to a bolt 4 which is secured in the bottom of the casing by threaded connection. Resting upon the plate 3 is a spring 5 which forms a yieldable support to the plunger or standard 6. The upward movement of the plunger is limited by a casing cap 7, which is threaded or otherwise suitably secured to the top of the casing or cylinder and apertured to permit a sliding movement of the neck or upper portion of the plunger or standard therethrough. On the upper end of the plunger is a slot 8 having a beveled portion 9, and a flat portion 10. In this slot 8 is mounted a foot-pedal 11 on the under side of which is a lug 12, apertured to receive a pin 13 which serves as a pivot on which the foot-pedal may be oscillated or tilted. The beveled portion 9 of the slot 8, permits the forward oscillation of the foot-pedal, and the flat portion 10 operates as a stop to the oscillation in the opposite direction because of the lug 12 coming in contact therewith. On the rear of the foot-pedal 11 is a pivoted rod 14 which is adapted to pass through an aperture 15 in the oscillatable lever 16. On the lower end of this rod 14 and below the lever 16, is a nut 17 which may be held in any desired position by a lock-nut 18. The purpose of said rod and said nuts is to form a suitable connection between the pedal 11 and lever 16.

Interposed between the flange of the casing and the lever 16 and surrounding the rod 14, is a spring 19 against which the upper-side of the lever 16 is actuated when the pedal is tilted forward. The spring 19 serves the further purpose of restoring the lever and pedal to their normal positions when pressure is removed from the foot-pedal.

The lever 16 is mounted on a pin 20 which is passed through a slot 21 in the plunger 6, and also through the outer wall of the casing 2. By passing the pin 20 through the slot 21, the plunger is prevented from rotating. In order to apply this mechanism to different makes of cars having differently located carburetors and also in order to make adjustments after installation, I have provided one portion of the lever 16 with prongs 22 between which may be secured another portion or arm 23, of the lever. The arm 23 is provided with a slot 24, through which bolts may be passed in making connection with the other portion of the lever, as will be readily understood. The arm 23 of the lever 16 is pivoted to another arm 25 which may be revolved on its pivot which may consist of a bolt 26, and may be made rigid with the arm 23 at any predetermined position, by tightening the nut 27. Connection between the throttle of the carburetor and the arm 25 of the lever 16, may be made in any suitable manner, as by a rod 28.

Briefly stated, the operation of my throttle control is as follows:

The driver places his foot on the foot-pedal 11. If he desires to increase the speed of his car he tilts the pedal forward, thereby raising the rod 14 which in turn pulls upward on the oscillating lever 16, causing it to rock on its fulcrum pin 20, tilting the opposite end of the lever 16 downward, thereby pulling the rod 28 to open the throttle. When the pressure on the toe of the foot-pedal is released, the spring 19 on the rod 14, will return the pedal and lever 16 to their normal positions. It will also be readily understood that the lever 16, when actuated to open the throttle, acts against the spring 19 preventing violent and undesired changes in the fuel supply resulting from jolting of the car when passing over rough places in the roadway. If in an emergency the driver becomes excited and presses violently upon the pedal, believing he is applying the brake, the plunger 6 is driven downward compressing the spring 5, and the rod 14 is projected downward through the apperture 15, carrying the nuts 17 and 18 away from the lever 16 so there is no force being exerted on the under side of the lever to open the throttle and the lever is held in normal position by the spring 19. The foot-pedal being mounted upon a standard having a resilient support, the spring 5, the driver is not disturbed in the control of his throttle by reason of the vibrations of the car due to rough places in the roadway. He is further aided in this respect by the spring 19 against which the throttle lever operates, as has already been explained.

A throttle lever and carburetor are conventionally shown in the drawing and may be of any type commonly in use and therefore need not be particularly described.

Having fully described my invention, what I claim is:

1. A throttle control apparatus for motor vehicles comprising an oscillatable foot-pedal mounted upon a plunger having a resilient support, a fuel supply regulator, an oscillatable lever connected to said fuel supply regulator and means connected to the foot-pedal and lever so that when the pedal is oscillated a like oscillation will be produced in the lever to actuate the fuel supply regulator.

2. A throttle control apparatus for motor vehicles comprising a fuel supply regulator, an oscillatable lever connected thereto, an oscillatable foot-pedal mounted upon a plunger, a casing in which said plunger is slidable, a resilient support for the plunger and means connected to said foot-pedal and said lever to actuate the fuel supply regulator.

3. A throttle control apparatus for motor vehicles comprising a fuel supply regulator, an oscillatable lever connected thereto, a plunger, an oscillatable foot-pedal mounted upon the plunger, a casing in which said plunger is slidable, a resilient support for the plunger, a guide within the casing to prevent the rotation of the plunger and means connected to said foot-pedal and said lever to actuate the fuel supply regulator.

4. A throttle control apparatus for motor vehicles comprising an oscillatable foot-pedal mounted upon a plunger having a spring support, means for adjusting the tension of the spring, a fuel supply regulator, an oscillatable lever connected to said fuel supply regulator, means connected to the pedal and the lever so that when the pedal is oscillated a like oscillation will be produced in the lever to actuate the fuel supply regulator.

5. A throttle control apparatus for motor vehicles comprising a fuel supply regulator, an oscillatable foot-pedal mounted upon a standard, an oscillatable lever connected to the fuel supply regulator, means connected to the pedal and the lever so that the oscillation of the pedal will oscillate the lever to actuate the fuel supply regulator and means for permitting the depression of the foot pedal and standard without actuating the fuel supply regulator.

6. A throttle control apparatus for motor vehicles comprising a fuel suply regulator, an oscillatable foot-pedal, an oscillatable lever connected to said fuel supply regulator, a resilient member between said pedal and lever, and means connected to said pedal and said lever so that when the pedal is oscillated the lever will be actuated against said resilient member.

In testimony whereof I affix my signature in presence of two witnesses.

GEORGE BAILHE.

Witnesses:
WALTER OLDS,
MARY L. TUMBLESON.